Feb. 8, 1949.                    F. O. HESS                    2,460,983
            AIRPLANE HEATER WITH ALTITUDE CONTROLLED
                        COMBUSTION AIR FEED
Filed Oct. 5, 1942                                    2 Sheets-Sheet 1
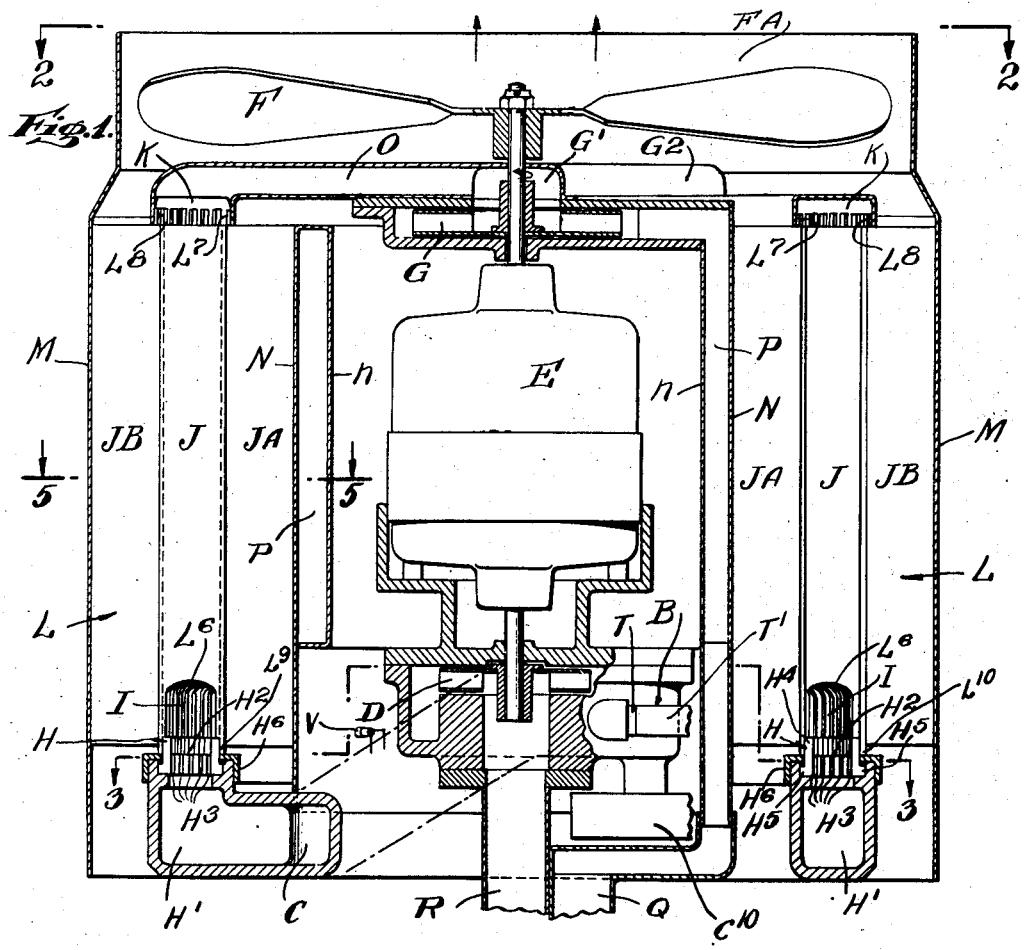
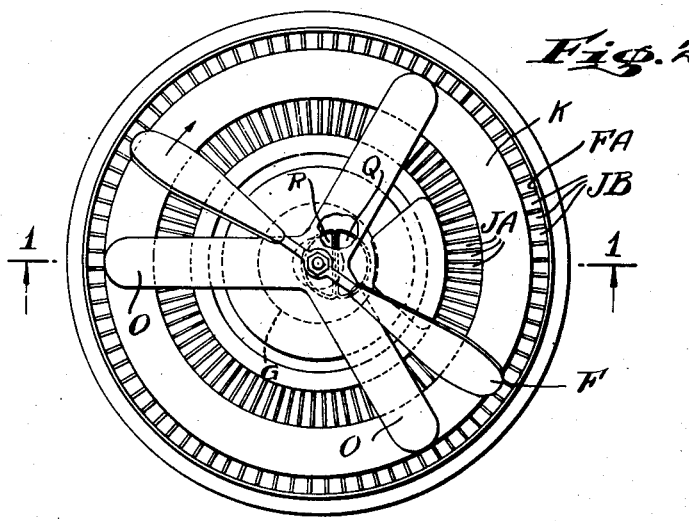
INVENTOR
FREDERIC O. HESS
BY
John E. Hubbell
ATTORNEY

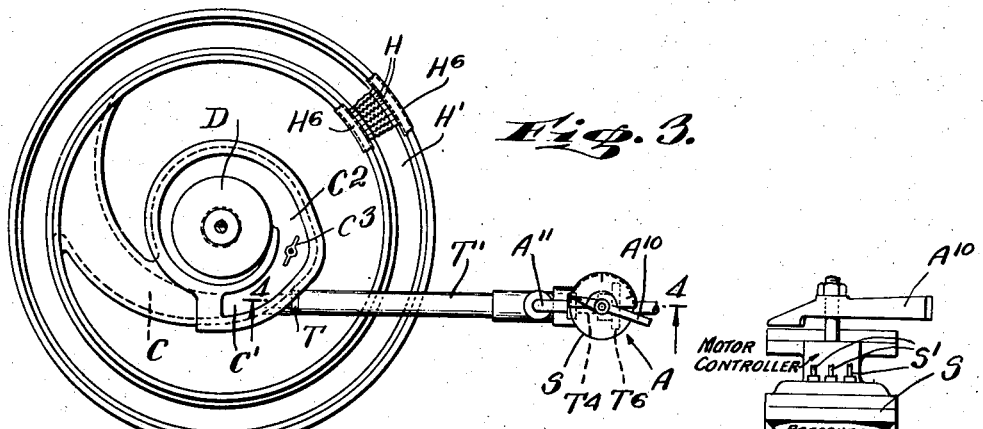
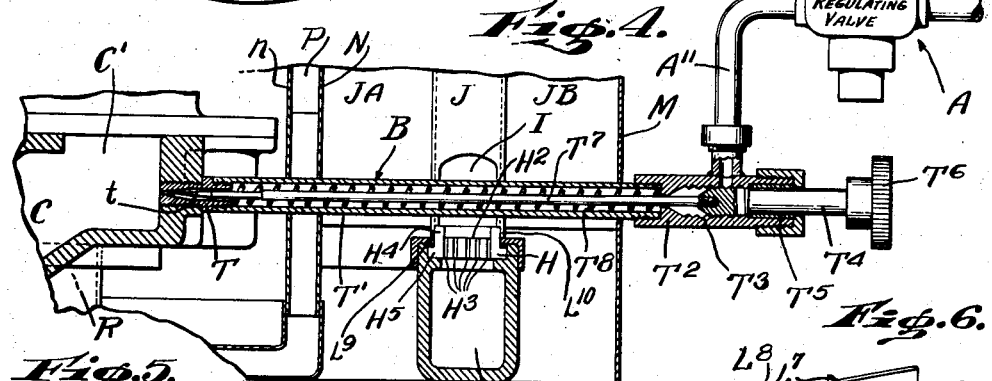
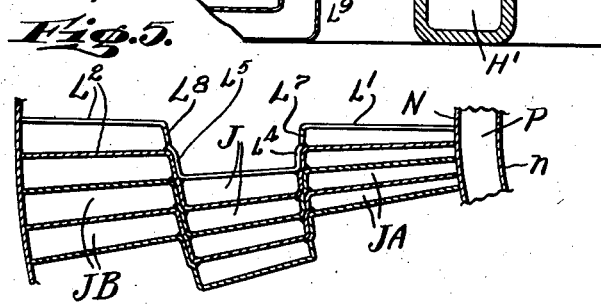
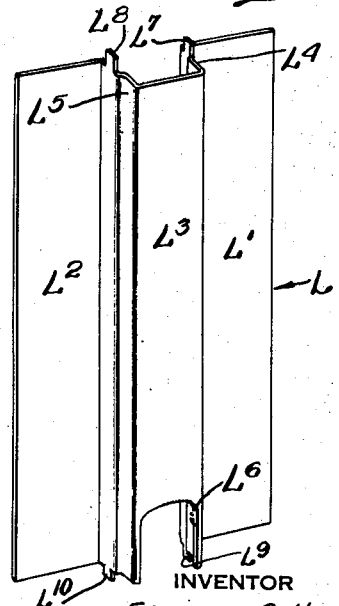
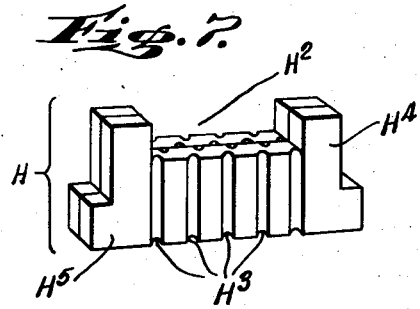

Patented Feb. 8, 1949

2,460,983

UNITED STATES PATENT OFFICE 2,460,983

AIRPLANE HEATER WITH ALTITUDE CONTROLLED COMBUSTION AIR FEED

Frederic O. Hess, Germantown, Pa., assignor to Selas Corporation of America, a corporation of Pennsylvania Application October 5, 1942, Serial No. 460,801

5 Claims. (Cl. 126—110)

The general object of the present invention is to provide an improved airplane heater which is especially useful for heating cabin spaces of transport airplanes, war plane spaces provided for pilots, observers and gunners, and in defrosting operations.

Special problems are presented when operating airplane heaters because of the wide variations in temperature and pressure of the atmosphere enveloping the airplane in flight. Thus, the normal atmospheric pressure at sea level is nearly 15 pounds per square inch, and at 40,000 feet above sea level it is less than 3 pounds per square inch. With an atmospheric temperature at a sea level point on the earth's surface of 100° F., the temperature at a point 40,000 feet above the first mentioned point, will normally be of the order of 50 or 60° F. below zero, but at times it may be 140° F. below zero, and an increase in its temperature from 140° F. below zero to 60° F. below zero, means an air density decrease of about 25 per cent. Furthermore, variations in the speed of the airplane relative to the air at which it is moving, may create a substantial change in pressure in the combustion space of the airplane heater. Thus, for example, it was found in one use of the present invention that a sharp airplane turn made a momentary change of nine inches of water in the pressure in the outlet opening at the skin of the airplane through which products of combustion were discharged from the airplane heater.

In the airplane heater of the invention the combustion space thereof is supplied with a mixture of fuel and air which normally decreases in density with increase in altitude of the airplane, and the supply of such air of varying density is controlled responsive to a condition affected by the altitude of the airplane so as to regulate the flow rate of the combustion supporting air and maintain a weight ratio of air to fuel in the combustion space which will provide satisfactory combustion conditions at different altitudes during flight of the airplane irrespective of change in density of the air supplied to the combustion space.

Further, provision is made for exhausting products of combustion from the airplane heater to the exterior of the airplane in a manner to minimize in the combustion space the effects of variation in suction, produced at the exhaust outlet at the exterior of the airplane when the latter is in flight, to maintain in the combustion space stable combustion conditions promoted by regulating the flow rate of combustion supporting air of varying density.

The various features of novelty which characterize my invention are pointed out with particularity in the claims annexed to and forming a part of this specification. For a better understanding of the invention, however, together with the above and other advantages and objects attained with its use, reference should be had to the accompanying drawing and descriptive matter in which I have illustrated and described one embodiment of the invention.

Of the drawings:

Fig. 1 is an elevation of an airplane heater in section on the line 1—1 of Fig. 2;

Fig. 2 is a plan view of the heater shown in Fig. 1;

Fig. 3 is a section taken on line 3—3 of Fig. 1;

Fig. 4 is a partial section on the line 4—4 of Fig. 3;

Fig. 5 is a partial section on the line 5—5 of Fig. 1;

Fig. 6 is an elevation of a heat exchanger wall element of the heater shown in Fig. 1; and Fig. 7 is a perspective view of a portion of the burner orifice wall of the heater shown in Fig. 1.

The heater shown in Figs. 1–7 is fully disclosed in my prior application, Serial No. 348,324, filed July 29, 1940, now abandoned, of which the present application is a continuation in part. In this heater liquid fuel, which ordinarily is airplane engine gasoline, is supplied under pressure through a pressure regulator A and an atomizing device B, to a mixing passage or space C. The latter receives combustion air through an inlet C′, to which air is supplied under pressure by a blower D of the turbo type which is driven by an electric motor E. The latter, in the preferred construction illustrated, also operates an air circulating fan F, and a heating gas exhaust fan G of the turbo type. As shown, the blower D and the fans F and G are directly mounted on the shaft of the motor E.

The combustible mixture of air and fuel formed in the space C, is discharged into the annular fuel chamber H′ of a burner H which is coaxial with the motor E and comprises a burner or orifice wall $H^2$, having orifices $H^3$ through which combustible jets of the fuel and air mixture are discharged into an annular combustion space I. In the construction shown, the burner H is of the desirable type disclosed in my Patent No. 2,228,114 granted January 7, 1941, in which the orifice wall $H^2$ is formed of side by side, radially extending plate-like bodies of ceramic material, with grooves in their sides which form the orifices $H^3$. As shown most clearly in Fig. 7, each ceramic plate is formed adjacent each end with a projection $H^4$, and the projections $H^4$ of the different plates unite to form the sides of a trough shaped ignition space into which the orifices $H^3$ open. Each of the ceramic plates is also formed with a shoulder extension $H^5$ at each end, which is overlapped by a flange of a corresponding annular retaining member $H^6$ of angle bar cross section and suitably secured to the body of the burner H.

As shown in Fig. 3, the air and fuel mixing space C is in the form of a bent, expanding nozzle, having a wall which may be cast integrally with the body of the burner H, and through which the combustible mixture formed in the space C is delivered to the burner chamber H' at a suitably moderate velocity. The air inlet C' to the passage C, is at the outlet end of a channel $C^2$ which extends about the axis of blower D for more than 360°, and increases in cross section along the length of the portion thereof directly receiving air from said blower. A damper $C^3$ located in the otulet portion of the channel $C^2$, is automatically adjusted by a Bourdon tube or analogous device $C^{10}$ which is responsive to variations in atmospheric pressure, resulting from variations in the altitude of the airplane in which the heater is used.

Products of combustion pass away from the combustion space I through the channels J of a heat exchanger shown as a channelled structure having products channels J and air channels JA and JB. The products channels J which form an extension of the combustion space I, are parallel to, and arranged in a circular series about the axis of the motor E, and open at their ends remote from the burner into a coaxial annular channel K. The air channels JA are arranged in a circular series at the inner side, and the air channels JB are arranged in a circular series at the outer side of the series of channels J. In the particular construction shown in Figs. 1–7, the various channels are separated from one another by sheet metal wall members L. Each member L is formed from a flat blank of sheet metal rectangular in outline, and bent or stamped to form a longitudinally extending trough shaped depression with inner and outer portions L' and $L^2$ lying in the same plane, a trough bottom portion $L^3$ laterally displaced from said plane, and transverse portions $L^4$ and $L^5$, which form the side walls of the trough. In the assembled structure as shown in Fig. 5, the trough portions of the adjacent walls L are nested together. The portions L', $L^2$ and $L^3$ of each wall L form the side walls of corresponding channels JA, J and JB respectively. The portions $L^4$ separate the adjacent edges of the chanenls JA and J and the wall portion $L^5$ separate the adjacent edge portions of the channels J and JB.

The wall blank is formed with a notch $L^6$ in one end portion of the central blank portion $L^3$, the edge of the notch extending about and defining the combustion space I. The side walls of the combustion chamber of the heater are formed by the blank portions $L^4$ and $L^5$. At the end of the wall blank remote from the burner, are integral extensions $L^7$ and $L^8$ of the blank portions $L^4$ and $L^5$. In the assembled structure, the various blank projections $L^7$ extend along the inner side wall of the channel K, and the projections $L^8$ similarly extend along the outer wall of the channel K. In the assembled channelled structure, the overlapping portions $L^4$ and $L^5$ may be welded or brazed together at the combustion chamber ends of the structure. As shown, the wall blank is formed at its burner end with projections $L^9$ and $L^{10}$ which are similar to, and welded and brazed together as are the projections $L^7$ and $L^8$. The overlapping portions $L^4$ and $L^5$ may be welded or brazed together along their entire lengths, but such welding or brazing may be unnecessary in heaters of moderate or small size, particularly if the air pressure in the channels JA and JB is higher than the heating gas pressure in the channels J, so that products of combustion will not leak into admixture with the air being heated.

As shown, the outer edges of the channels JB are closed by a cylindrical sheet metal wall M, which constitutes the shell or outer wall of the heater body, and the inner edges of the channels JA are closed by a cylindrical sheet metal wall N. As shown, the ends of the air channels JA and JB adjacent the burner are open to the cabin or other space in which the heater is located, and the ends of the channels remote from the burner are open to said space through a fan chamber FA which is surrounded by an end portion of the wall M, of somewhat smaller diameter than the body portion of the wall M. The fan F works in the chamber FA and draws cabin air from the cabin or other space to be heated and in which the heater is located, through the channels JA and JB, and discharges the air heated into said space. As will be apparent, some of the air heated does not pass through the channels JA and JB, but is drawn through the annular space between the motor E and the surrounding structure.

As shown, the exhaust fan G is located between the motor E and the air circulation fan F. The inlet chamber G' of the exhaust fan G receives products of combustion from the annular channel K through one or more radial conduits O. The outlet $G^2$ of the fan G delivers products of combustion to an exhaust pipe Q. In the construction shown, the outlet $G^2$ is connected to the pipe Q through an annular space P surrounding the motor E and having its outer wall formed by the wall N, and its inner wall formed by a concentric cylindrical wall $n$.

As shown, the body of the pipe Q is in the form of a half cylinder with its flat wall in contact with the flat wall of a similarly shaped pipe R supplying combustion air to the inlet of the blower D. The pipes R and Q extend to the outside atmosphere. By associating a suitable hood with the external end of one or each of the pipes, a pressure differential between the two pipes may be created when the airplane is in flight, which may be high enough to appreciably reduce the draft load collectively carried by the fans D and G.

The previously mentioned pressure regulator A, is located at the outer side of the heater shell M and is, in effect, an automatic pressure reducing valve comprising differential valve operating means subjected to a suitable valve opening force, and to an opposing valve closing force which is formed in part by the pressure at which the liquid is discharged from the regulator. The angular adjustment of the handle $A^{10}$ varies one of said opposing forces, usually by varying the compression of a spring, and thereby varies the liquid discharge pressure required to maintain the valve opening and closing forces in balance. The handle $A^{10}$ when adjusted to vary the fuel pressure, also varies the speed of the motor E, by adjusting suitable motor control means S, which may be mounted in the regulator A and connected to conductors S' included in the motor energizing circuit provisions, which may take any usual form. The motor control and fuel pressure regulator provisions are thus so cooperatively related that the adjustment of a single simple control element, such as the handle $A^{10}$ may increase or decrease the speed of the motor E and simultaneously increase or decrease the pressure of the fuel supplied by the regulator A to the burner H.

The described increase and decrease in the speed of the motor E, tends to increase and decrease the supply of combustion air to the burner chamber H' and movement of air to be heated through the channels JA and JB as the fuel supply pressure, and thereby the rate of fuel supply to the burner is increased and decreased. Thus, when the fuel oil supply pressure is increased to provide an increased cabin heating effect, the more active circulation of the cabin atmosphere then effected by the motor E through fan F, tends to avoid objectionable local variations in the cabin temperature. The fact that the heater control is manually effected, and is simple in character, is of especial advantage when the heater is employed to heat the turret or gun space of a war plane in which the temperature needed for the body comfort and welfare of the gunner may vary widely with the conditions under which he is working.

The previously mentioned atomizing device B is in the form of a needle valve, comprising a valve seat member T threaded into the part C' and formed with a tapered port which may be closed or variably throttled by a correspondingly tapered valve member $t$. The casing of the atomizing valve comprises a tubular body T' in threaded engagement at one end with the valve seat member T and extending radially through the channeled structure at a level intermediate the top and bottom of the combustion chamber I. The outer end of the body T' external to the shell M, is threaded into a valve casing section $T^2$ having internally threaded portion $T^3$ receiving the threaded portion of a valve spindle part $T^4$. The latter extends through a stuffing box $T^5$ at the end of the part $T^2$, and is provided at its outer end with a knob $T^6$. The valve stem part $T^4$ is connected by a rod $T^7$ to the needle valve member $t$.

The rod $T^7$ is smaller in diameter than the bore of the casing or barrel T', and a wire $T^8$ coiled to form an open pitch helix surrounding the rod $T^7$ defines and separates the convolutions of a helical fuel path in the annular space between the rod $T^7$ and the surrounding barrel T'. The regulator outlet $A^{11}$ opens to the bore of the part $T^2$, in a portion thereof normally occupied by the threaded valve spindle portion $T^3$, so that the adjacent portion of the flow path leading to the ported valve seat member T is formed by the clearance space between the threaded surfaces of the valve parts $T^2$ and $T^3$ and is therefore desirably restricted. The elongation of a flow path through the barrel T', due to its helical form, is adapted to insure a relatively high rate of heat absorption by the gasoline flowing along the path from the hot gases in the combustion space I, and by radiation from the orifice wall $H^2$.

As it passes into the mixing space C through the restricted passage between the needle valve T and the surrounding valve seat member, the heated gasoline is atomized and dispersed into a desirably intimate admixture with the combustion air supplied through the inlet C'. In consequence, the burner chamber H' is supplied with a combustible mixture adapted to burn freely and effectively in the combustion space I.

The use of fuel supplied at a pressure, such as for example, 25 pounds or so, which can be easily maintained by a hand pump, if necessary under emergency conditions, permits a suitable rate of fuel supply to the burner to be maintained at all times, notwithstanding the wide variations in atmospheric temperatures and pressures experienced in the operation of an airplane at the now customary altitudes ranging up to and above 25,000 feet. The automatic control of the damper $C^3$ by the pressure responsive device $C^{10}$ tends to insure the supply of a suitable volume of combustion air to the fuel mixing space C regardless of the variations in atmospheric pressure.

Ignition of the combustible mixture entering the combustion chamber I may be effected by suitable ignition means, such as the electrical igniter V, extending into the chamber I as shown in Fig. 1, and comprising sparking electrodes or a "hot wire."

The supply conduit connection to the heater combustion chamber I includes the pipe R, fan D and burner wall $H^2$, and the exhaust piping connected to the outlet end of chamber J includes the pipe Q and fan G. The provision of a separate fan in each of the two conduit connections, and especially in the exhaust piping, tends to stabilize the combustion conditions in the combustion chamber, notwithstanding the variations in suction effect at the outlet of the exhaust piping due to variations in speed and sharp turns of the airplane.

It will now be understood that an improvement has been provided for maintaining satisfactory combustion conditions in the combustion space I at different altitudes during flight of the airplane irrespective of changes in density of the combustion air supplied to the combustion space, which combustion air normally decreases in density with increase in altitude of the airplane. The automatic control of the damper $C^3$ by the pressure responsive device $C^{10}$ insures the supply of a suitable volume of combustion air to the fuel mixing space regardless of the variations in atmospheric pressure. Stated another way, the damper $C^3$ operates responsive to a condition, such as atmospheric pressure, for example, which influences air density and which is affected by the altitude of the airplane.

The preheating of the gasoline passing to the atomizing device facilitates the proper atomizing of the gasoline with simple atomizing provisions such as those illustrated in Fig. 4. It is possible, however, by the use of suitable atomizing provisions of known types to atomize gasoline without preheating the latter. Such atomizing provisions may be of the type, for example, in which the velocity of the combustion air entering the mixing space and the velocity of the gasoline discharged by the atomizing valve or nozzle are both utilized in effecting the atomization of the gasoline.

While in accordance with the provisions of the statutes, I have illustrated and described a single embodiment of my invention, it will be apparent to those skilled in the art that changes and modifications may be made in the form of the apparatus disclosed without departing from the spirit and scope of my invention, as set forth in the following claims.

Having now described my invention what I claim as new, and desire to secure by Letters Patent, is:

1. For use in an airplane, a heating system comprising a heat radiating unit including means forming a combustion space, structure communicating with the space to continuously supply to the latter for combustion therein during flight of the airplane a combustible mixture of fuel and air which normally decreases in density with increase in altitude of the airplane, said structure including means providing a path of flow for the air and a fuel line through which liquid fuel is adapted to be supplied under pressure, the fuel being discharged under pressure from the fuel line into the presence of the air to produce a combustible mixture, flow regulating means adjustable to regulate the volumetric rate at which air of varying density is supplied to said space, and means responsive to the pressure of the ambient atmosphere to adjust said regulating means and thereby vary the volumetric rate at which air of varying density is supplied to the space so as to maintain a weight ratio of air to fuel which will provide satisfactory combustion conditions in the space during flight of the airplane irrespective of change in density of the air supplied to the space.

2. In an airplane, a heating system therefor comprising a heat radiating unit including means forming a combustion space, structure communicating with the space to continuously supply to the latter during flight of the airplane a combustible mixture of fuel and air which normally decreases in density with increase in altitude of the airplane, said structure including means providing a path of flow for the air and a fuel line through which liquid fuel is adapted to be supplied at a regulated pressure, said fuel line terminating in a discharge orifice positioned so that fuel is discharged therefrom into the air supplied through said path of flow to produce the combustible mixture, means to initiate combustion of the combustible mixture supplied to said space, and means responsive to variations in the pressure of the ambient atmosphere to regulate the volumetric flow rate at which air of varying density is supplied to the space so as to maintain a weight ratio of air to fuel which will provide satisfactory combustion conditions in the space during flight of the airplane irrespective of change in density of the air supplied to the space.

3. In an airplane, a heating system therefor comprising a heat radiating unit including means forming a combustion space, structure communicating with the space to continuously supply to the latter during flight of the airplane a combustible mixture of fuel and air which normally decreases in density with increase in altitude of the airplane, said structure including means providing a path of flow for the air from the exterior of the airplane to the space and a fuel line through which liquid fuel is adapted to be supplied under pressure, the fuel being discharged under pressure from the fuel line into the air to produce the combustible mixture, means to initiate combustion of the combustible mixture, flow regulating means adjustable to regulate the volumetric rate at which air of varying density is supplied to said space, and means responsive to the pressure of the ambient atmosphere to adjust said regulating means and thereby vary the volumetric rate at which air of varying density is supplied to the space so as to maintain a weight ratio of air to fuel which will provide satisfactory combustion conditions in the space during flight of the airplane irrespective of change in density of the air supplied to the space.

4. For use in an airplane, a heating system comprising a heat radiating unit including means forming a combustion space, a fuel line communicating with the space and through which liquid fuel is adapted to be supplied under pressure, pressure regulating means in said fuel line which is substantially unaffected by change in altitude of the airplane, structure including conduit means connected to the space for continuously supplying to the latter during flight of the airplane combustion supporting air which is at one density at a first altitude of the airplane and at a lower density at a second higher altitude of the airplane, said fuel line terminating at a region from which fuel under pressure is discharged into the air received by the space to produce a combustible mixture, means to initiate combustion of the combustible mixture, flow regulating means adjustable to regulate the volumetric rate at which air of varying density is supplied to said space, and means responsive to the pressure of the ambient atmosphere to adjust said regulating means and thereby vary the volumetric rate at which air of varying density is supplied to the combustion space with change of altitude so as to maintain a weight ratio of air to fuel which will provide satisfactory combustion conditions in the space at the first and second higher altitudes during flight of the airplane irrespective of change in density of air supplied to the space.

5. For use in an airplane, a heating system comprising a heat radiating unit including means forming a heating space having an inlet and an outlet, said space forming means being imperforate except at the inlet and the outlet and providing a substantially free path of flow for fluid from a region adjacent to the inlet to a region adjacent to the outlet; means including a burner to completely close off the inlet; structure connected to said burner for delivering thereto a combustible mixture of air and fuel, said structure including means forming a chamber and an imperforate connection therefrom to said burner, means connected to said chamber for continuously supplying thereto during flight of the airplane combustion supporting air which normally decreases in density with increase in altitude of the airplane, and a fuel line through which liquid fuel is adapted to be supplied under pressure, the fuel line terminating in the chamber and having a restricted discharge orifice; said burner including a wall member interposed between the space and the chamber and having a number of small openings therein establishing communication between the space and the chamber and constituting the sole passages for admitting fluid into the space, means for igniting the small jets issuing from the discharge ends of the openings; flow regulating means adjustable to regulate the volumetric rate at which air of varying density is supplied to said space, and means responsive to the pressure of the ambient atmosphere to adjust said regulating means and thereby vary the volumetric rate at which air of varying density is supplied to the chamber so as to maintain a weight ratio of air to fuel which will provide satisfactory combustion conditions in the space during flight of the airplane irrespective of change in density of the air supplied to the chamber.

FREDERIC O. HESS.

REFERENCES CITED

The following references are of record in the file of this patent:

UNITED STATES PATENTS

| Number | Name | Date |
|---|---|---|
| 1,558,848 | Doble | Oct. 27, 1925 |
| 1,779,162 | Evers | Oct. 21, 1930 |
| 2,264,869 | Beardsley | Dec. 2, 1941 |
| 2,286,853 | Holthouse | June 16, 1942 |
| 2,289,208 | Pinkerton et al. | July 7, 1942 |
| 2,308,887 | McCollum | Jan. 19, 1943 |
| 2,308,888 | McCollum | Jan. 19, 1943 |
| 2,314,089 | Hess et al. | Mar. 16, 1943 |